United States Patent [19]

Carson, Jr. et al.

[11] 4,029,236

[45] June 14, 1977

[54] TWO PRODUCT DISPENSER WITH COOPERATING TELESCOPING CYLINDERS

[75] Inventors: John C. Carson, Jr., Manasquan Park; Robert T. Hall, Trenton; Divaker B. Kenkare, South Plainfield; Clarence R. Robbins, Piscataway, all of N.J.

[73] Assignee: Colgate-Palmolive Company, New York, N.Y.

[22] Filed: May 17, 1976

[21] Appl. No.: 686,843

[52] U.S. Cl. .............................. 222/135; 222/320; 222/386
[51] Int. Cl.² .......................................... B67D 5/56
[58] Field of Search ......... 222/135, 136, 137, 319, 222/320, 405, 386

[56] References Cited

UNITED STATES PATENTS

| | | |
|---|---|---|
| 1,926,367 | 9/1933 | Booth ................................ 222/320 |
| 2,655,289 | 10/1953 | Peal ................................ 222/405 X |
| 2,826,339 | 3/1958 | Maillard ............................ 222/137 |
| 2,915,225 | 12/1959 | Atkins ................................ 222/320 |
| 3,208,645 | 9/1965 | Rayner ................................ 222/319 |

FOREIGN PATENTS OR APPLICATIONS 776,150  1/1935  France ................ 222/386

Primary Examiner—Drayton E. Hoffman
Assistant Examiner—David A. Scherbel
Attorney, Agent, or Firm—Kenneth A. Koch; Herbert S. Sylvester; Murray M. Grill

[57] ABSTRACT

A product dispenser for dispensing two products simultaneously comprising a first cylinder having a first product therein and having an end wall. The end wall has a tongue and groove joint with the first cylinder. The first cylinder is provided with a piston plate therein and the first cylinder in turn forms the piston of a second product therein. The parts are so arranged that movement of the first cylinder relative to the second cylinder will actuate the piston plate as well as discharge both products.

10 Claims, 5 Drawing Figures

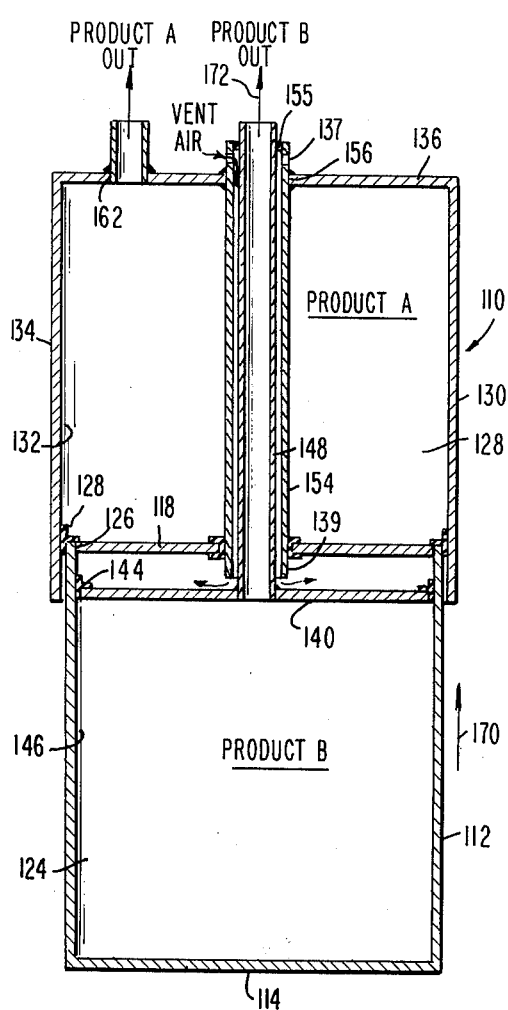
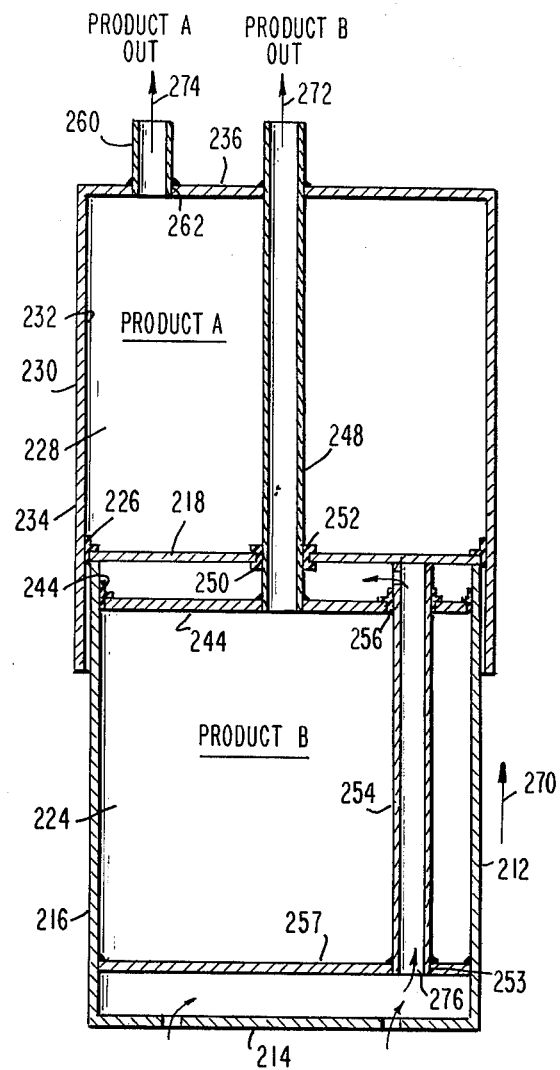
FIG. 4
FIG. 5

1

TWO PRODUCT DISPENSER WITH COOPERATING TELESCOPING CYLINDERS

BACKGROUND OF THE INVENTION

1. FIELD OF THE INVENTION

This invention relates to a piston driven product dispenser and more particularly to a container and dispenser having codispensing capabilities.

2. DESCRIPTION OF THE PRIOR ART

In the past various types of liquids, creams, and jells have been dispensed from various devices including piston operated product dispensers. Such a dispenser is disclosed in U.S. Pat. No. 3,208,645. The disadvantage of this type of dispenser when used for dispensing a product is that approximately 50% of the package space can not be used for the product. Further, in the prior art previous piston dispensers, which have provided for codispensing, the pistons occupy far too large an amount of the package space. This reduces the amount of product that can be conveniently pakaged in these prior art devices.

SUMMARY OF THE INVENTION

The present invention overcomes the disadvantages of the prior art by allowing the use of most of the package volume while providing codispensing capabilities.

In accordance with the pesent invention a cylinder is provided in which a piston plate is mounted. The first cylinder in turn forms a piston for a second cylinder. The foregoing allows different products to be packaged in each of two cylinders.

It is, therefore, an important object of the present invention to provide a piston driven product dispenser which has codispensing capability.

It is, therefore, a further object of the present invention to provide a piston driven product dispenser which makes use of most of the available space of the package, and which allows for efficient codispensing.

The construction of this invention features a product dispenser having a first cylinder provided with a piston plate for communicating and dispensing the product in the first cylinder. The first cylinder acts as a piston for the second cylinder. The piston rod is fixed securely to the forward wall so that movement of the end wall toward the forward wall will dispense both products through said delivery tube and said piston rod.

These, together with the various ancillary features of this invention, which will become more apparent as the following description proceeds, are attained by this piston driven product dispenser having codispensing capabilities, a preferred embodiment of which is illustrated in the accompanying drawing, by way of example only, wherein:

BRIEF DESCRIPTION OF THE DRAWING

FIG. 4 is a vertical sectional view of a modified form of the invention having a vent tube concentrically disposed about a delivery tube; and, FIG. 5 is a vertical sectional view of another embodiment of the invention.

DETAILED DESCRIPTION OF THE INVENTION

Figure 1:
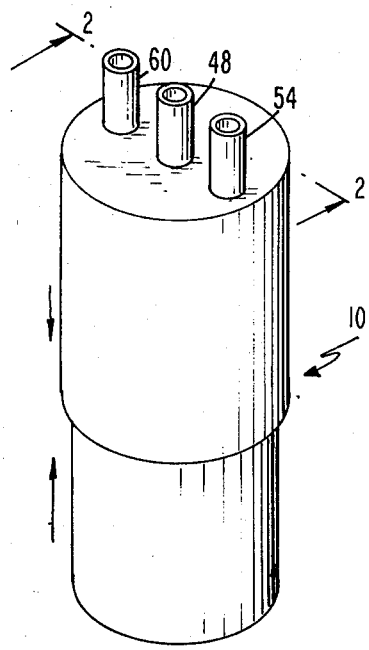
FIG. 1 is a perspective view of the piston driven product dispenser.
Figure 2:
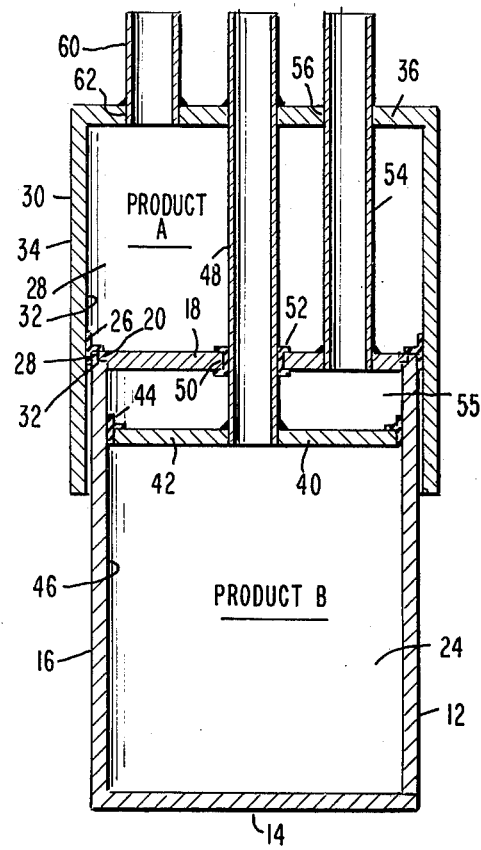
FIG. 2 is a vertical sectional view taken along the plane of line 2—2 in FIG. 1, and showing the invention with the products stored therein.
Figure 3:
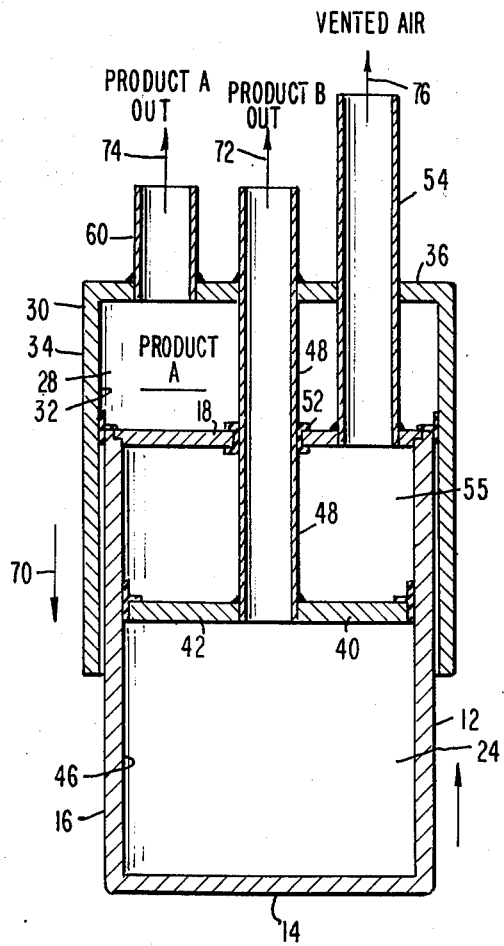
FIG. 3 is a view similar to FIG. 2, but showing the dispenser after some of the product has been discharged.

With continuing reference to the accompanying drawing, wherein like reference numerals designate similar parts throughout the various views, reference numeral 10 is used to generally designate the product dispenser constructed in accordance with the concepts of the present invention. As shown in the drawing the product dispenser 10 is generally cylindrical in shape, but obviously while the parts must be tubular the product dispenser 10 can be of a rectangular or of other configurations so long as the parts mesh or fit.

The product dispenser 10 includes a first cylinder 12 having a bottom wall 14, a cylindrical side wall 16, and an end wall 18 which is removably secured to the side wall 16 and is provided with a tongue 20 which fits into a groove 22 in the upper peripheral edge of the side wall 16. The first cylinder 12 defines a chamber 24 in which a product B, such as a cream, liquid or jell, is disposed.

A T-shape seal 26 extends about the periphery of the top wall 18 and overlies a tongue and groove joint 28 formed between the top wall 18 and side wall 16. This seal 26 is compatible with product B and with product A within a chamber 28 within a cylinder 30. The seal 26. cleanly sweeps the inner wall surface 32 of the cylindrical side wall 34 of a second cylinder 30.

The second cylinder 30 has an upper forward wall 36 and is open at the bottom. Accordingly, the first cylinder 12 forms a piston for the second cylinder 30 and the T-shape seal 26 forms the piston ring for the piston defined by the first cylinder 12.

Mounted within the first cylinder 12 is a piston plate 40 in the shape of a disc 42 carrying a T-shape seal 44 in wiping contact with the inner wall surface 46 of the cylindrical side wall 16. A tube 54 extends through an opening 56 in the forward wall 36 and serves as an air intake vent for the space 55 formed as the piston plate 40 is moved away from the end wall 18 when product is dispensed. It also serves as a guide for the piston formed by the cylinder 12. The piston rod 48 is fixed securely to the piston plate 40 and is used to deliver product B from first cylinder 12. The piston rod is fixed to the forward wall. A delivery tube 60 extends from the opening 62 formed in the forward wall, and is fixed securely to the upper wall 36.

The tubes 48, 60 and 54, or any of them may be flexible to reduce storage space if desired. The product delivery tubes 48 and 54 may dispense their products into a common delivery area as shown where they may be mixed, or onto a common surface or into a common mixing chamber, not shown. The tubes 48 and 54 may be of different diameters for allowing for varying rates of discharge.

Refering now to FIG. 4, the product dispenser 110 includes a first cylinder 112 having a bottom wall 114, a cylindrical side wall 116, and an end wall 118 which is removably secured to the side wall 116. The first cylinder 112 defines a chamber 124 in which a product B, such as a cream, liquid or jell, is disposed.

A T-shape seal 126 extends about the periphery of the top wall 118 overlies the joint 128 formed between the top wall 118 and side wall 116. This seal 126 is compatible with product B and with product A within a chamber 128 within a cylinder 130. The seal 126 cleanly sweeps the inner wall surface 132 of the cylindrical side wall 134 of the second cylinder 130.

The second cylinder 130 has an upper forward wall 156 and is open at the bottom. Accordingly, the first cylinder 112 forms a piston for the second cylinder 130 and the T-shape seal 126 forms the piston ring for the piston defined by the first cylinder 112.

Mounted within the first cylinder 112 is a piston plate 140 in the shape of a disc 142 carrying a T-shape seal 144 in wiping contact with the inner wall surface 146 of the cylindrical side wall 116. A tube 154 extends through an opening 156 in the forward wall 136 serves as an air intake vent and for the first cylinder 112 and also serves as a guide for the piston formed by the cylinder 112. Air inlet openings 137 and air outlet openings 139 are formed in tube 154 to eliminate chance of clogging. The tube or piston rod 148 in fixedly secured to the piston plate 140 and is used to deliver product B from first cylinder 112. The piston rod 48 is fixed to the tube 154 and is concentric therewith. A delivery tube 160 extends from the opening 162 formed in the forward wall 136, and is fixedly secured to the upper wall 136.

In use, with product A in the chamber 128 and product B in the chamber 124, pressure on the cylinder 112 to move it in the direction of the arrow 170 will cause product B to move up through the tube 148 and outwardly in the direction of arrow 172. Product A will then be compressed by the movement of the upper wall 118 and move outwardly in the direction of arrow 174 through opening 162 and delivery tube 160 while air will move inwardly through tube 54 in the direction of arrow 178.

The parts can be manufactured of any suitable plastic material. Alernatively, any suitable metal may be used to form the various parts. The piston driven product dispenser has codispensing capabilities whereby both product A and B are codispensed. One pertinent application of the invention is dispensing of an effervescent shave cream which requires the separate compartmentization of the two components of the product prior to dispensing. Other uses are for hair dyes which include peroxide and a pigment or like products which when mixed have only a short shelf life, but when the components are separated have an indefinite life.

Refering now to FIG. 5 a first cylinder 212 is provided having a bottom wall 214, cylindrical side walls 216, and an end wall 218.

The cylinder 212 defines a chamber 224 in which the product B such as a cream, liquid or jell is disposed. A T-shape seal 226 extends about the periphery of the top wall 218. This seal 226 is compatible with product B and with product A within a chamber 228 within a cylinder 230. The seal 226 cleanly sweeps the inner wall surface 232 of the cylindrical side walls 234 of cylinder 230. The cylinder 230 has an upper forward wall 236 and is open at the bottom. Accordingly, the cylinder 212 forms a piston for cylinder 230 and the T-shape seal 226 forms the piston ring for the piston defined by the cylinder 212.

Mounted within the cylinder 212 is a piston plate 240 in the shape of a disc 242 carrying a T-shape seal 244 in wiping contact with the inner wall surface 232 of the cylindrical side wall 234 and having an opening through which a tublar piston rod 248 secured to end wall 218 extends through an opening 250 in the end or upper wall 218. A seal 252 is provided for wiping contact with the piston rod 48 and is mounted about the opening 250 in the disc 242 and is compatible with both products A and B. A vent tube 254 which suitably slidably extends through an opening 56 in the disc 244 and opening 253 in bottom plate 257 serves as a vent. A delivery tube 260 extends from the opening 262 formed in the forward wall 236, and is fixedly secured to the upper wall 36.

In use, with product A in the chamber 228 and product B in the chamber 224, pressure on the cylinder 212 to move it in the direction of the arrow 270 will cause product B to move up through the tube 248 and outwardly in the direction of arrow 272. Product A will then be compressed by the movement of the upper wall 218 and move outwardly in direction of arrow 274 through opening 262 and delivery tube 60 while air will move inwardly through tube 254 in the direction of arrow 276.

A latitude of modification, substitution and change is intended in the foregoing disclosure, and in some instances some features of the invention will be employed without a corresponding use of other features of the invention.

What is claimed is:

1. A product dispenser comprising a first cylinder having an end wall, a piston plate in said cylinder having hollow piston rod extending slidably through said end wall for communicating and dispensing the contents of said cylinder outwardly of said cylinder, a second cylinder having a forward wall provided with a delivery tube therein and a vent tube communicating with the interior of said first cylinder, said first cylinder functioning as a piston for said second cylinder, said piston rod being fixedly secured to said forward wall so that movement of said end wall toward said forward wall will move said piston plate away from said end wall to force a first product in said first cylinder outwardly through said piston rod and to force a second product in said second cylinder out through said delivery tube.

2. A product dispenser according to claim 1, said end wall being detachably connected to said first cylinder.

3. A product dispenser according to claim 2, including tongue and groove connection between said end wall and said first cylinder.

4. A product dispenser according to claim 3, including a T-shaped seal forming a piston ring between said piston plate and said first cylinder and said first cylinder and said second cylinder.

5. A product dispenser according to claim 4, wherein said T-shape seal between said first cylinder and said second cylinder overlies the joint between said end wall and said first cylinder.

6. A product dispenser according to claim 1, wherein said vent tube is flexible.

7. A product dispenser according to claim 1, wherein said product delivery tubes are flexible.

8. A product dispenser according claim 1, wherein said product delivery tubes discharge into a common mixing area.

9. A product dispenser according to claim 1, wherein said pistons are selectively of different sizes to allow for the dispensing of products contained in each of the said cylinders at different ratios.

10. A product dispenser according to claim 1, wherein said piston rod is concentric with said vent tube.

* * * * *